(12) United States Patent
Stefan et al.

(10) Patent No.: US 8,061,046 B2
(45) Date of Patent: Nov. 22, 2011

(54) LASER INSTRUMENT

(75) Inventors: Barth Stefan, Feldkirch (AT); Manfred Ammann, Lauterach (AT)

(73) Assignee: Hilti Aktiengesellschaft, Schaan (LI)

( * ) Notice: Subject to any disclaimer, the term of this patent is extended or adjusted under 35 U.S.C. 154(b) by 273 days.

(21) Appl. No.: 12/536,430

(22) Filed: Aug. 5, 2009

(65) Prior Publication Data

US 2010/0031520 A1 Feb. 11, 2010

(30) Foreign Application Priority Data

Aug. 6, 2008 (DE) .......................... 10 2008 041 029

(51) Int. Cl.
*G01C 15/00* (2006.01)
(52) U.S. Cl. .......................................... 33/286; 33/290
(58) Field of Classification Search .................... 33/285, 33/286, 290, 227, 228, DIG. 21, 281–283
See application file for complete search history.

(56) References Cited

U.S. PATENT DOCUMENTS

| | | | | |
|---|---|---|---|---|
| 6,073,354 A | * | 6/2000 | Rando | 33/291 |
| 6,763,596 B1 | * | 7/2004 | Puri et al. | 33/286 |
| 6,877,203 B2 | * | 4/2005 | Engstrom et al. | 29/407.09 |
| 2005/0081393 A1 | * | 4/2005 | Su et al. | 33/286 |
| 2008/0028624 A1 | * | 2/2008 | Chen | 33/286 |
| 2010/0031520 A1 | * | 2/2010 | Stefan et al. | 33/290 |
| 2010/0031521 A1 | * | 2/2010 | Stefan et al. | 33/290 |

* cited by examiner

*Primary Examiner* — Yaritza Guadalupe
(74) *Attorney, Agent, or Firm* — Crowell & Moring LLP

(57) ABSTRACT

A laser instrument is disclosed. The laser instrument having a laser unit, and a sliding bearing device with a joint socket and a sliding unit, where the sliding unit has a convex surface in the shape of cylinder section and the joint socket has a concave surface in the shape a hollow cylinder section such that the convex surface can engage in the concave surface and the laser unit tilts in a swivel plane during a relative movement between the convex surface and the concave surface.

25 Claims, 7 Drawing Sheets

LASER INSTRUMENT

This application claims the priority of German Patent Document No. 10 2008 041 029.2, filed Aug. 6, 2008, the disclosure of which is expressly incorporated by reference herein.

BACKGROUND AND SUMMARY OF THE INVENTION

The invention relates to a laser instrument having a laser unit and a sliding bearing device.

In this case, a laser instrument should be understood as a construction laser such as those that are used in the construction industry for the purposes of defining, transmitting or leveling planes, lines or points. As a result, static construction lasers such as point or line lasers can likewise be subsumed under the term "laser instrument" just like rotary construction lasers, in which the laser unit emits an at least partially rotating laser beam. In particular, the invention is used with rotary construction lasers having a laser unit embodied as a rotational unit, which is why for the sake of simplicity the following specification also relates to this type of construction laser. However, it should be noted that this does not represent a restriction of the protective scope and the invention also relates to all other types of construction lasers having an adjustable laser unit.

Rotary construction lasers having a laser unit embodied as a rotational unit, which emits an at least partially rotating laser beam, are used primarily in the construction industry in order to generate and define horizontal, vertical or defined inclined planes on walls, ceilings and floors. Rotary construction lasers are also used, for example, in scanning operations to establish predefined sections of planes or markings (points, lines, etc.) or to generate them as a reference.

A rugged design is of great significance in the case of rotary construction lasers, because equipment in the construction industry is subjected to extraordinary stresses. At the same time, the equipment must posses a high level of precision. Defining planes or markings or the like must be accomplished with a high level of precision.

Therefore, it is important to achieve a rugged design for the rotary construction lasers wherein adjusting a predetermined angle of inclination of the rotational unit with respect to the housing of the rotary construction laser is precise and simple.

A bearing device for tilting or adjusting the rotational unit of the rotary construction laser must therefore be rugged and easy to adjust. In this case, the rotational unit is essentially adjusted by means of a bearing device. In other words, as a general rule, a rough adjustment is made prior to adjustment, for example, by an operator. This may be accomplished, for example, manually by utilizing levels that are externally visible and attached to the rotary construction laser. Afterwards, the operator may initiate an automatic adjustment, whereby the rotational unit is fine-tuned (adjusted), for example, by means of servomotors and the bearing device.

The objective of the invention is making available a rotary construction laser which satisfies the above-mentioned requirements. Additional advantages of the rotary construction laser are disclosed in the following specification.

The rotary construction laser described here features a rotational unit. The rotational unit can, for example, be rotatably mounted with ball bearings around an axis of rotation and have a deflection device. The deflection device in this case can be used to deflect the laser beam.

The rotary construction laser further comprises a sliding bearing device with a joint socket and a sliding unit or a first sliding part. The sliding unit has a convex surface in the shape of a cylinder section and the joint socket has a concave surface in the shape of a hollow cylinder section such that the convex surface can be engaged in the concave surface. The rotational unit is connected to the sliding unit such that the rotational unit tilts in a swivel plane during a relative movement between the convex surface and the concave surface.

The concave and convex surfaces sliding on one another may be embodied, for example, in the shape of one or more glide shoes. Tilting of the rotational unit is thus produced by sliding the convex surface on the concave surface.

Very good anti-twist protection is yielded due to the embodiment of the sliding bearing device by means of the described convex or concave surfaces. The sliding properties can be precisely defined and twisting with respect to the axis of the cylinder forming the basis of the cylinder section and the axis of the hollow cylinder forming the basis of the hollow cylinder section is not possible.

Furthermore, the embodiment of relatively large sliding surfaces guarantees great mechanical ruggedness. In particular, there is no point mounting. The sliding surfaces in this case may also be interrupted or have different widths. They may also have recesses, for example, in order to thereby reduce the frictional resistance. It is possible to meet the most varied of requirements because of the concrete embodiment of the sliding surfaces.

The sliding bearing therefore produces very good anti-twist protection that has already been mentioned. The good sliding properties are realized by the predefined sliding surfaces.

In addition, because of the embodiment of the sliding bearing device by means of the defined concave or convex surfaces, a swivel plane is definitely predetermined in which the rotational unit tilts. The swivel plane in this case is essentially perpendicular to the axis of the cylinder forming the basis of the cylinder section. There is therefore a preferential direction (swivel plane) in which the rotational unit can be tilted. This is one advantage over other bearings, e.g., a bearing using a ball, universal ball joint, or cardan joint. In the case of these types of bearings, other guiding means must be provided in order to assure a tilt in a preferential direction. As a result, it is possible to dispense with these types of guiding means because of the invention.

In a preferred embodiment, the sliding unit can include an additional sliding bearing device with an additional joint socket and an additional sliding unit (second sliding part). In this connection, the additional sliding unit has an additional convex surface in the shape of an additional cylinder section and the additional joint socket has an additional concave surface in the shape of an additional hollow cylinder section. In this case, the additional convex surface can engage in the additional concave surface such that the rotational unit tilts in an additional swivel plane during a relative movement between the additional convex surface and the additional concave surface. The additional swivel plane can be independent or different from the swivel plane.

In a preferred embodiment, the swivel plane and the additional swivel plane are at a predetermined angle from one another. The angle in this case can be invariable so that the angle between the swivel planes is determined by the predetermined angle between the axes of the cylinder and of the hollow cylinder. The swivel plane and the additional swivel plane can also be at right angles to one another in a preferred embodiment.

Also preferred is that the radii of the cylinder section and of the hollow cylinder section are essentially equal. As a result, the concave and convex surfaces have the greatest possible contact surface and therefore good guidance and good sliding properties. The radii of the additional cylinder section and of the additional hollow cylinder section can also be essentially equal in a further embodiment. As a result, it also applies here that the additional concave or convex surfaces have an adequate contact surface and therefore good guidance or good sliding properties. The radii of the cylinder section, the additional cylinder section, the hollow cylinder section and the additional hollow cylinder section can also all be essentially equal.

In a further embodiment, the deflection device is embodied such that it deflects the laser beam at a deflection point corresponding to the exit point of the laser beam. The center point or the axis of the cylinder forming the basis of the cylinder section, the center point or the axis of the cylinder forming the basis of the additional cylinder section, the center point or the axis of the hollow cylinder forming the basis of the hollow cylinder section and/or the center point or the axis of the hollow cylinder forming the basis of the additional hollow cylinder section can preferably coincide with the deflection point.

When the center point or the axis of the cylinder forming the basis of the cylinder section, the center point or the axis of the cylinder forming the basis of the additional cylinder section, the center point or the axis of the hollow cylinder forming the basis of the hollow cylinder section and/or the center point or the axis of the hollow cylinder forming the basis of the additional hollow cylinder section coincide with the deflection point, then the height of the deflection point does not change when the rotational unit is tilted. As a result, a simple adjustment of a predefined angle is possible without complicated calculations. In addition, the deflection device can be built into the housing of the rotary construction laser in a compact way. In particular, the housing can be a short distance from the deflection device. This would not be possible with a height adjustment or a change in the distance between the deflection device and the inner housing wall such as those that occur in the case of other known mountings. The sliding bearing described here thus makes a compact and space-saving configuration of the rotary construction laser possible.

Tension springs can preferably be provided, by means of which the concave surface and the convex surface can be pressed together or pulled toward one another. As a result, it is possible for the concave surface and convex surface to remain in contact in all positions. Similarly, additional tension springs can be provided, by means of which the additional concave surface and the additional convex surface can be pressed together or pulled toward one another. The effect of the springs in this case as well is that a predefined force acts on the sliding surfaces and therefore an essentially constant or adjustable sliding property is achieved essentially independent of the position of the housing of the rotary construction laser.

In a preferred embodiment, a safety device firmly connected to the joint socket can also be provided, by means of which the sliding unit can be prevented from falling out of the joint socket. Similarly, the additional joint socket can also feature an additional safety device, by means of which the additional sliding unit can be prevented from falling out of the additional joint socket.

In another preferred embodiment, the convex surface can be produced of material whose sliding property has been modified. The concave surface in this case can be produced of material whose sliding property has not been modified so that a good sliding property is achieved. Likewise, the additional concave surface can be produced of material whose sliding property has been modified and the concave surface and the additional convex surface of material whose sliding property has not been modified. For example, the concave surface and the additional convex surface can be produced of normal plastic and the convex surface and the additional concave surface of plastic whose sliding property has been modified. This results in good sliding properties between the concave and convex surfaces as well as between the additional concave and additional convex surfaces.

The invention is further explained in the following on the basis of the figures.

DETAILED DESCRIPTION OF THE DRAWINGS

Figure 1:
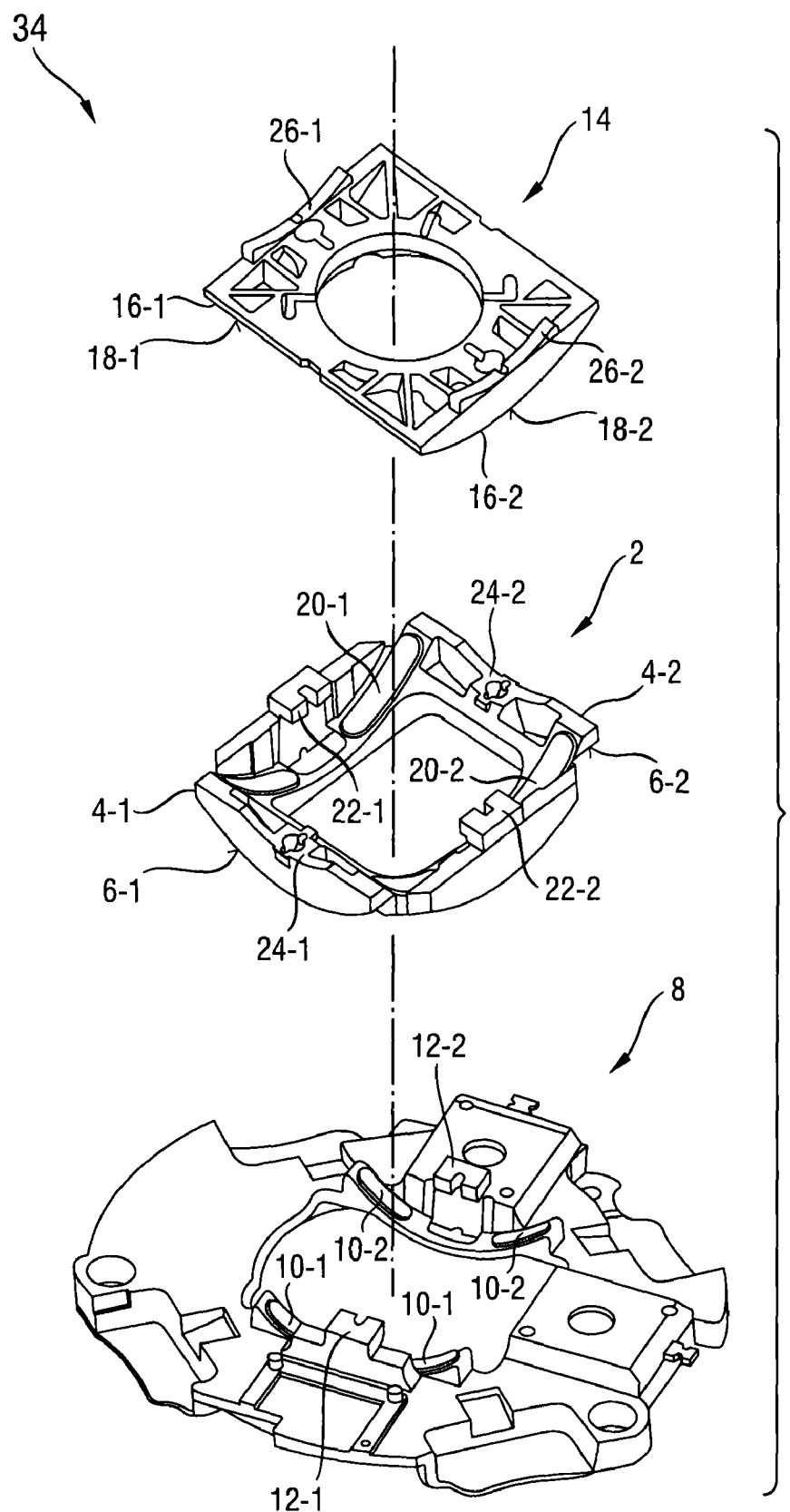
FIG. 1 is a perspective view of the components of the sliding bearing device.

FIG. 1 shows a first sliding part 2 (sliding unit) with first glide shoes 4-1 and 4-2 and first convex surfaces 6-1, 6-2. The first convex surfaces 6-1, 6-2 in this case have the shape of a cylinder section. FIG. 1 also shows a mounting plate 8 with first concave surfaces 10-1, 10-2 and first safety devices or projections 12-1, 12-2. The concave surfaces 10-1, 10-2 have the shape of a hollow cylinder section and form the joint socket of the sliding bearing. Since tilting is only possible in a predetermined swivel plane, the bearing is also designated as a hinge. The swivel plane in this case is essentially perpendicular to the axis of the cylinder forming the basis of the cylinder section or to the axis of the hollow cylinder forming the basis of the hollow cylinder section.

When assembling the sliding bearing device, the first sliding part 2 is inserted into the mounting plate 8 so that the first convex surfaces 6-1, 6-2 come to rest on the first concave surfaces 10-1, 10-2. In order to achieve good contact and therefore good sliding properties, the first concave surfaces 10-1, 10-2 have the shape of a hollow cylinder section, wherein the radius of the hollow cylinder forming the basis of the hollow cylinder section is equal to the radius of the cylinder forming the basis of the cylinder section of the convex surface.

When assembling the sliding bearing device, the first glide shoe 4-1 then slides with the first convex surface 6-1 on the first concave surface 10-1. Furthermore, the first glide shoe 4-2 slides with the first convex surface 6-2 on the first concave surface 10-2.

In order to prevent the first sliding part 2 from falling out of the mounting plate 8, the mounting plate 8 has the first safety device 12-1, 12-2. As depicted in FIG. 1, the first safety device is embodied in the shape of projections, which, during a relative movement of the first sliding part 2 with respect to the mounting plate 8, move along a circular cutout 24 in the first sliding part 2. As a result, the sliding bearing device then remains fully functional if the rotary construction laser is dropped or set upside down for example.

When the first convex surfaces 6-1, 6-2 slide on the first concave surfaces 10-1, 10-2, a rotational unit (not shown in FIG. 1, see FIG. 7) associated with the first sliding part 2 is tilted in a first swivel plane, which runs parallel to the glide shoes 4-1, 4-2.

According to the invention, a tilting of the rotational unit can thus be achieved just by providing the first sliding part 2 and the mounting plate 8. Tilting in a first swivel plane is possible as a result. Tilting in other swivel planes or other free tilting can be facilitated by a second sliding part 14 (additional sliding unit). In one embodiment (not shown), tilting in a second swivel plane can be possible however by other known means.

The second (additional) sliding part 14 has second glide shoes 16-1, 16-2 and second (additional) convex surfaces 18-1, 18-2. The second convex surfaces 18-1, 18-2 have the shape of a second (additional) cylinder section.

In order to realize tilting in the second swivel plane, the second sliding part 14 is inserted into the first sliding part 2. To do this, the first sliding part 2 has second concave surfaces 20-1, 20-2, which touch the second convex surfaces 18-1, 18-2 when the sliding bearing device is assembled. In this connection, the second convex surface 18-1 touches the second concave surface 20-1 and the second convex surface 18-2 touches the second concave surface 20-2. The first sliding part forms a second (additional) joint socket with the second concave surfaces 20-1, 20-2.

In order to prevent the second sliding part 14 from falling out of the first sliding part 2, the first sliding part 2 has a second safety device 22. The safety device is formed from two projections 22-1, 22-2, which, during a relative movement between the first sliding part 2 and the second sliding part 14, move along concave-shaped projections 26-1, 26-2.

The first concave surfaces 10-1, 10-2 therefore form a first "joint socket." Furthermore, the second concave surfaces 20-1, 20-2 form a second (additional) joint socket.

As already indicated above, it is also possible to attain only one inclination in a swivel plane with the invention. As a result, it suffices for the invention if the sliding bearing device is realized by inserting the first sliding part 2 into the mounting plate 8. Any means can be provided to realize inclinations that deviate from the first swivel plane or inclination plane. Providing a second sliding part 14 as shown in FIG. 1 is just one possibility. The second sliding part 14 is therefore to be viewed as optional.

The first sliding part 2 can also be designated as a "cross glider," because it forms, as it were, the middle piece of the sliding bearing device and facilitates a tilting of the rotational unit in two swivel planes that are perpendicular to one another by means of the first glide shoes 4-1, 4-2 and the second concave surfaces 20-1, 20-2.

At this point is should be noted that it is by no means imperative that the two swivel planes be perpendicular to one another. All advantages cited in the specification can also be achieved if this is not the case and the swivel planes are at another predetermined angle from one another.

The first sliding part 2 can advantageously be produced from a material whose sliding property has been modified, e.g., plastic. Further, the mounting plate 8 and the second sliding part 14 can be produced from a material whose sliding property has not been modified, e.g., plastic whose sliding property has not been modified. As a result, good sliding properties are produced along all sliding surfaces 10-1, 10-2, 6-1, 6-2, 20-1, 20-2, 18-1, 18-2, because material whose sliding property has not been modified slides respectively on material whose sliding property has been modified.

With regard to the concave or convex surfaces in FIG. 1, it must also be noted that the radii of the cylinder/hollow cylinder forming the basis of the convex/concave surfaces are essentially equal and the center point or the axis of the cylinders or the hollow cylinders coincide with a deflection point or exit point of the laser (not shown in FIG. 1, see FIG. 7). To do this, the height of the rotational unit, which for example is rotatably mounted in the second sliding part 14, must be correspondingly set or adjusted (see FIG. 7).

Figure 2:
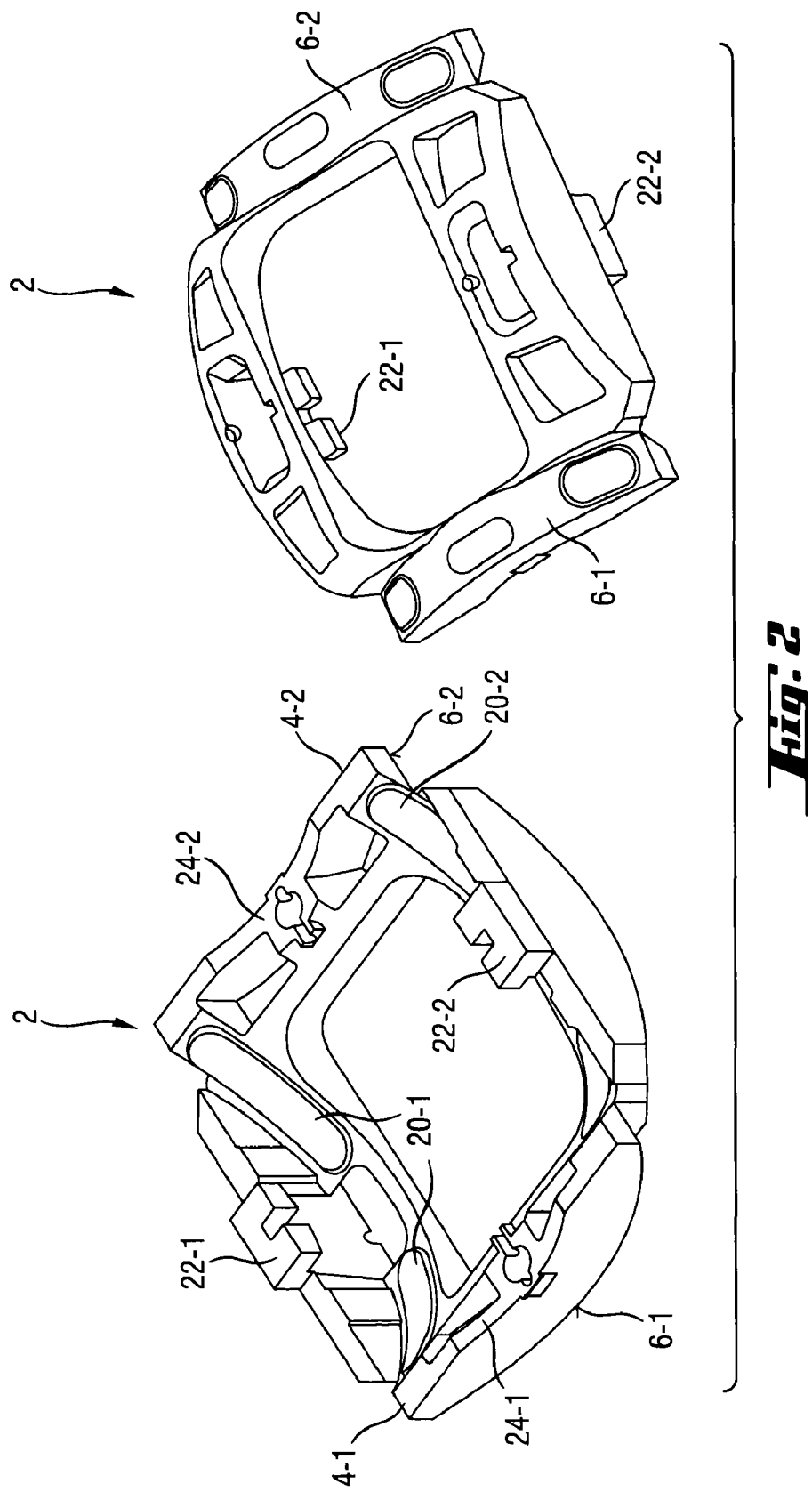
FIG. 2 is a perspective view of the first sliding part of the sliding bearing device.
Figure 3:
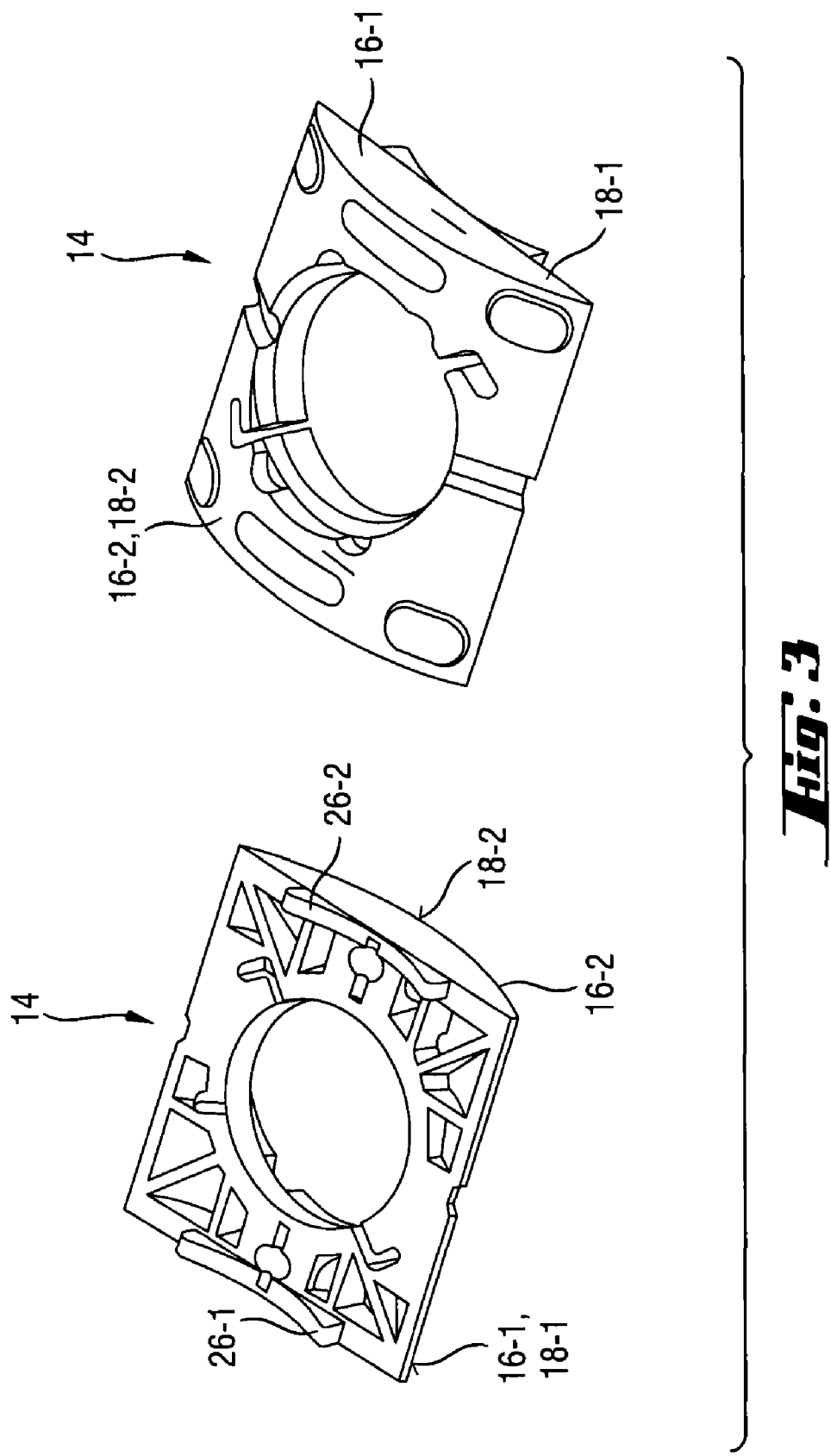
FIG. 3 is a perspective view of the second sliding part of the sliding bearing device.

FIG. 2 shows a perspective view from above and below of the first sliding part 2 (cross glider). Moreover, FIG. 3 shows a perspective view from above and below of the second sliding part 14.

Figure 4:
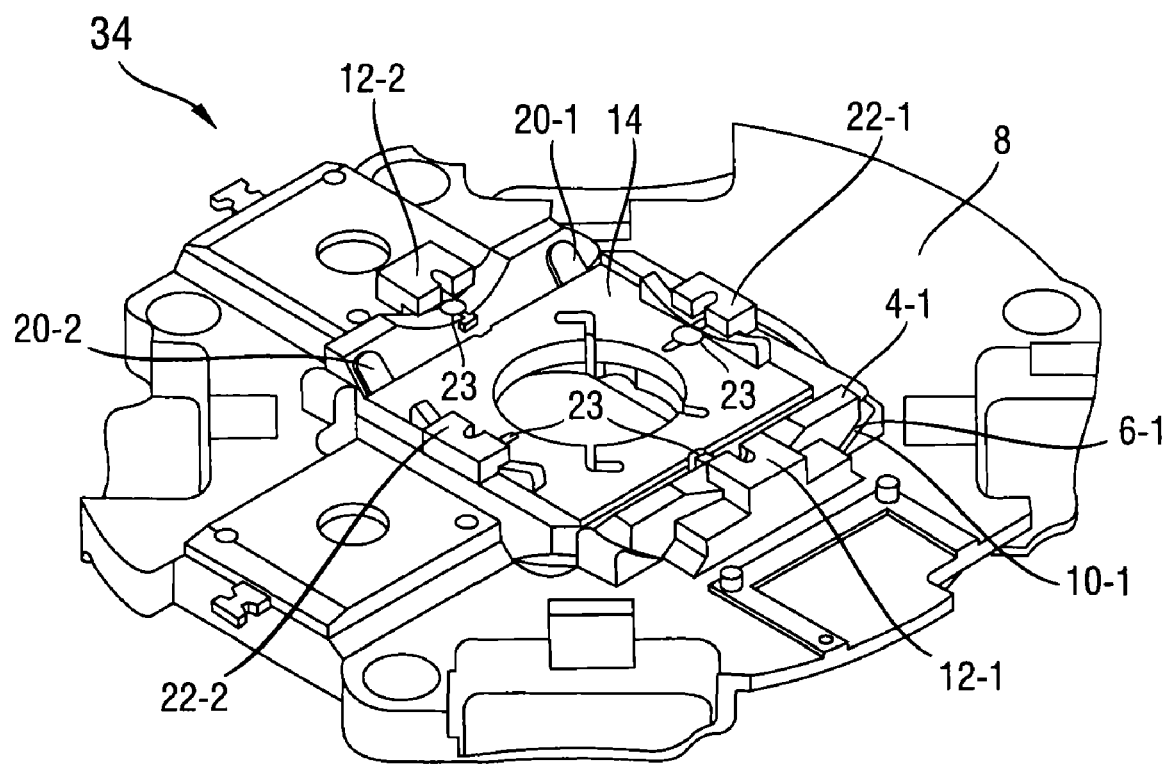
FIG. 4 is a perspective view of the assembled sliding bearing device.

FIG. 4 depicts the mounting plate 8 with the first sliding part 2 inserted therein. The second sliding part 14 is inserted into the first sliding part 2. FIG. 4 also shows tension springs 23, which are inserted into corresponding recesses. The concave surface and the convex surface can be pressed together or the additional concave surface and the additional convex surface can be pressed together by means of tension springs. As a result, it is possible to achieve that the concave surface and convex surface remain in contact in all positions or that a predefined force acts on the sliding surfaces and therefore an essentially constant or adjustable sliding property is achieved essentially independent of the position of the housing of the rotary construction laser.

Figure 5:
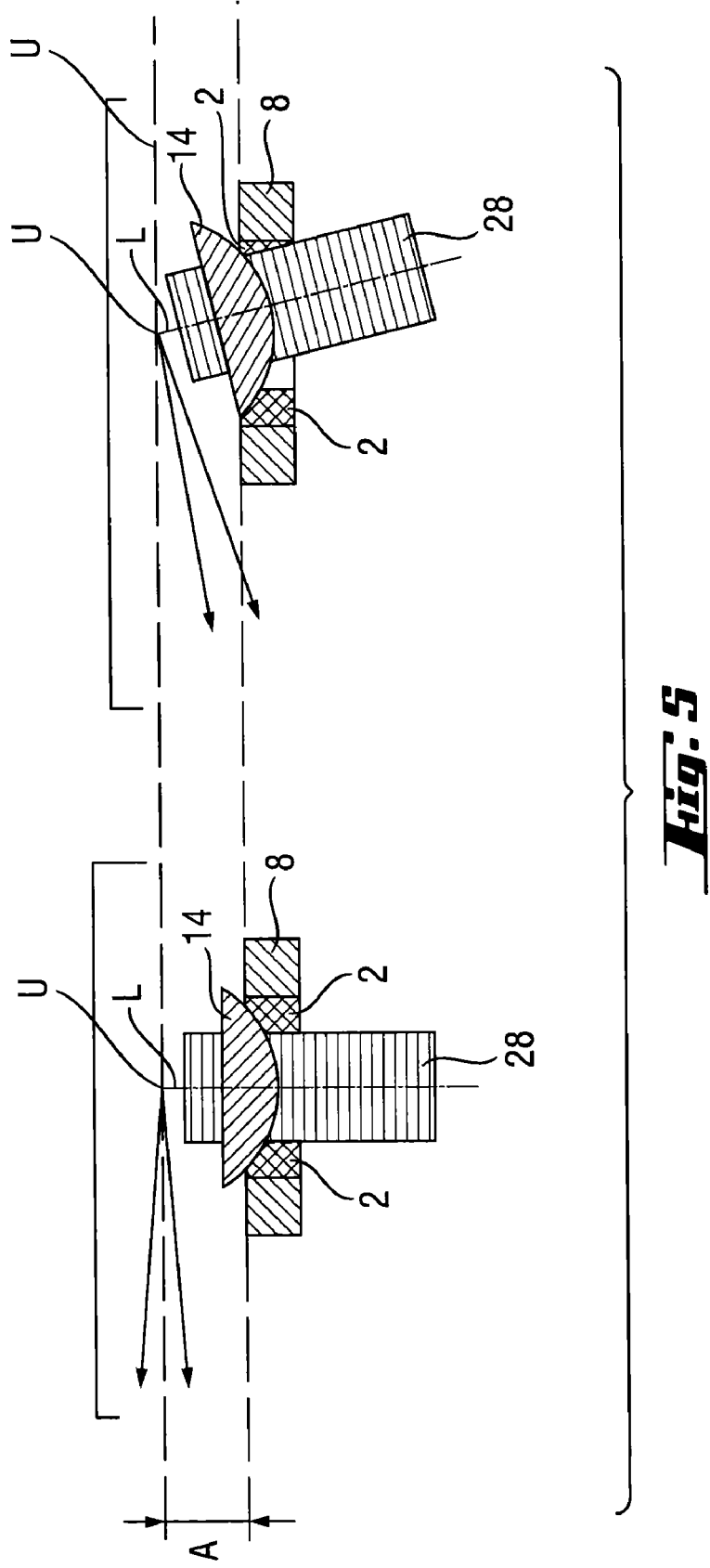
FIG. 5 is a schematic view to clarify the action of the sliding bearing device.

FIG. 5 shows a schematic view of the rotary construction laser with the laser unit 28 positioned in the sliding bearing device. The laser unit 28 generates a laser beam L, which is deflected at a deflection point U by means of a deflection device (not shown). Based the position of the deflection point U or exit point of the laser in the center point or the axis of the cylinders or hollow cylinders forming the basis of the respective concave or convex surfaces, the deflection point U does not change its position when the laser unit 28 is tilted. In particular, the deflection point U does not change its height A with respect to the mounting plate 8.

Figure 6:
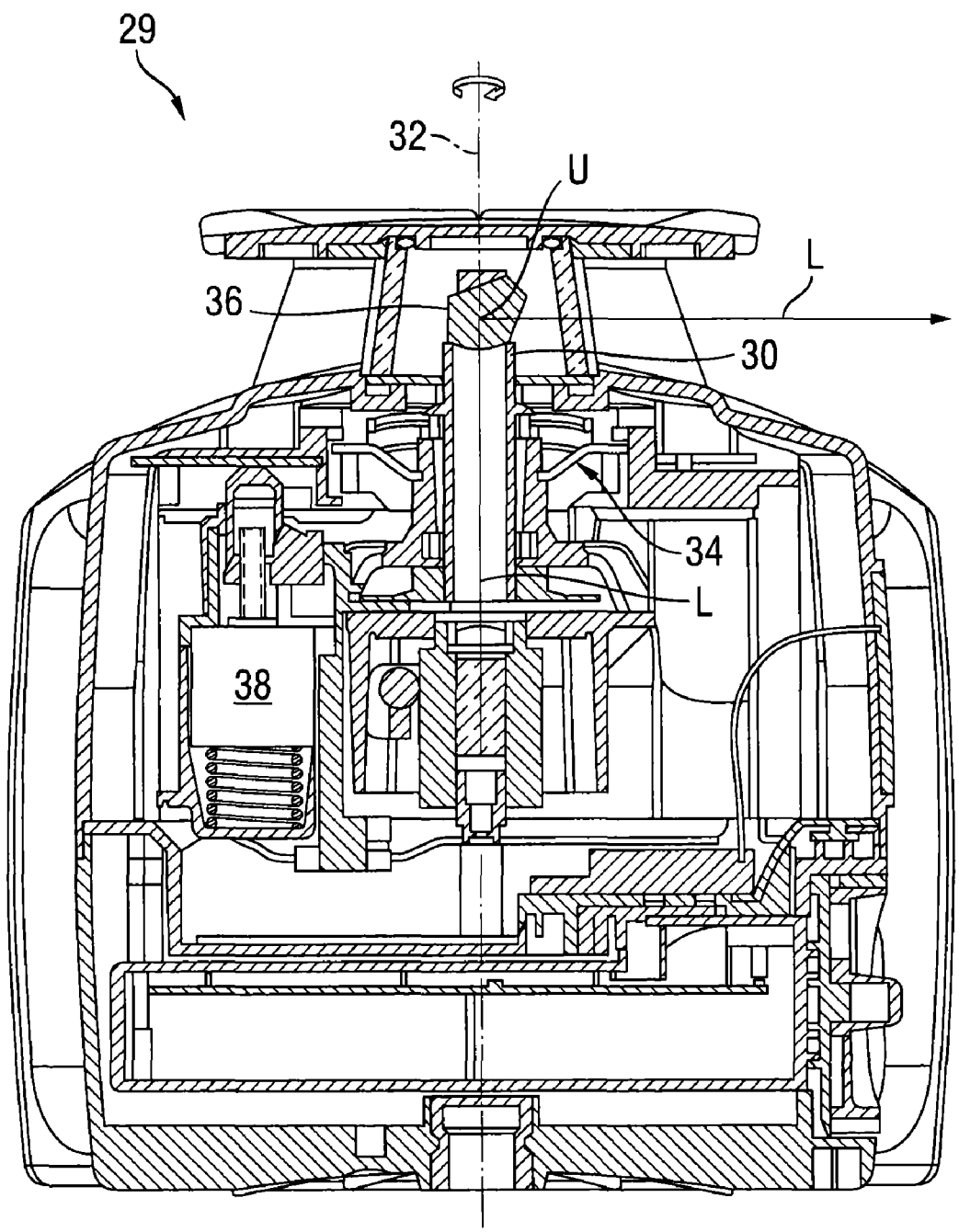
FIG. 6 is a sectional view of the rotary construction laser with a rotational unit and sliding bearing device.

FIG. 6 shows a sectional view of a rotary construction laser 29 with a rotational unit 30 and a sliding bearing device 34, in which a laser unit is positioned. The rotational unit 30 is rotatably mounted around a rotary axis of rotation 32.

The rotary construction laser 29 also features a deflection device 36, by means of which a laser beam L generated in the laser unit can be deflected. The deflection point U or exit point of the laser lies in the center points or axes of the cylinders or hollow cylinders forming the basis of the concave or convex surfaces.

The rotary construction laser 29 further has at least one drive 38, by means of which the laser unit and thus the rotational unit 30 can be tilted in a pre-definable angle.

Figure 7A:
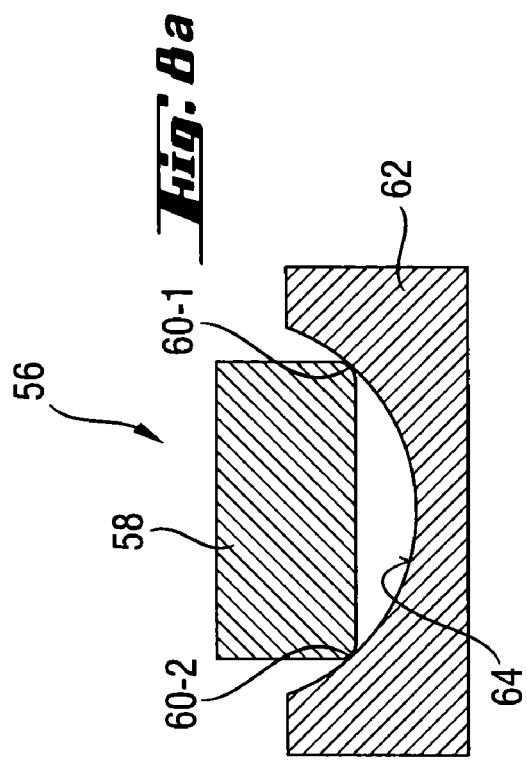
FIGS. 7A and 7B are further embodiments of a sliding bearing device, wherein the joint socket has sliding areas or contact areas.

FIG. 7a shows a further embodiment of a sliding bearing device 40. The sliding bearing device 40 is comprised of a sliding part 42 with a convex surface 44 in the shape of a cylinder section and a joint socket 46.

The joint socket 46 features two contact areas 48-1, 48-2. The convex surface 44 touches the contact areas 48-1, 48-2 when the sliding part 42 is inserted into the joint socket 46. In the embodiment in FIG. 7a, the contact areas 48-1, 48-2 have a round shape so that essentially in each case a contact point is established between the convex surface 44 and the respective contact area 48-1, 48-2. In the case of a relative movement of the sliding part 42 with respect to the joint socket 46, the contact areas or contact surfaces or contact points thus move along the convex surface and thus on a cylinder section.

Figure 7B:
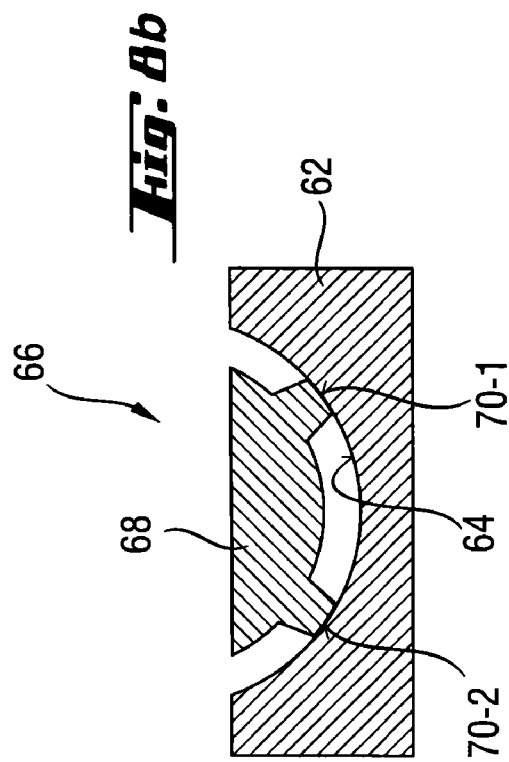

FIG. 7b shows a further embodiment of a sliding bearing device 50 with essentially the same sliding part 42 having a convex surface 44 as in FIG. 7a. The joint socket 52 is designed differently than in FIG. 7a however. The contact areas 54-1, 54-2 have the shape of a hollow cylinder section.

Other shapes of the joint socket are also conceivable. For example, the joint socket could be V-shaped so that the convex surface 44 of the sliding part 42 in FIGS. 7a and 7b rest at two points (contact areas) on the inner side of the V-shape.

Figure 8A:
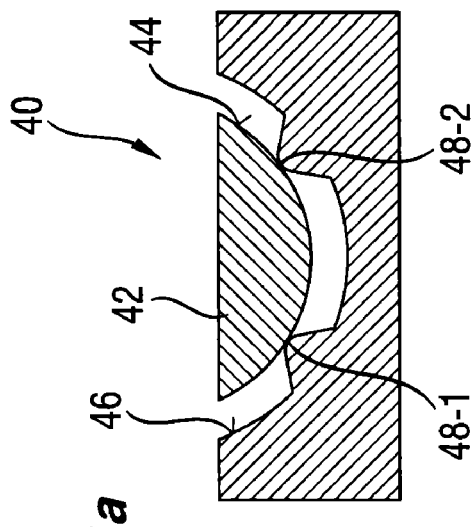
FIGS. 8A and 8B are further embodiments of a sliding bearing device, wherein the sliding part has contact areas.

FIG. 8a shows another embodiment of a sliding bearing device 56 with a sliding part 58 and a joint socket 62. The sliding part 58 has two contact areas 60-1, 60-2 and the joint socket 62 is comprised of a concave surface 64 in the shape of a hollow cylinder section.

When inserting the sliding part 58 into the joint socket 62, the sliding part 58 touches the concave surface 64 of the joint socket 62 with its contact areas 60-1, 60-2.

As a result, during a movement of the sliding part 58, the contact areas 60-1, 60-2 of the sliding part 58 move relative to the joint socket 62 along the concave surface 64.

Figure 8B:
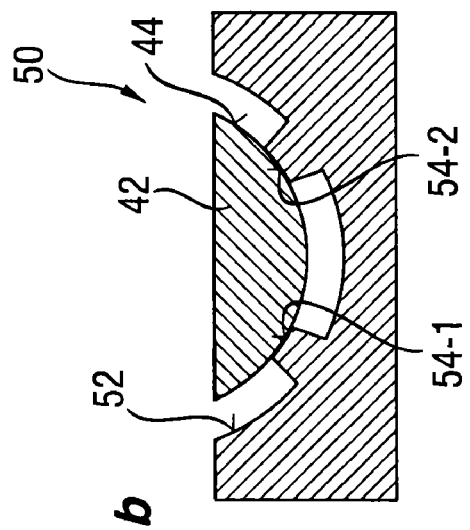

FIG. 8b depicts another embodiment of a sliding bearing device 66. In this case, the joint socket is designed the same as in FIG. 8a. However, the sliding part 68 has contact areas 70-1, 70-2 with a convex section in the shape of a cylinder section.

The foregoing specification described three different embodiments of sliding bearing devices. A first possible embodiment of a sliding bearing device is depicted in FIGS. 1 through 6. In the case of a sliding bearing device according to FIGS. 1 to 6, the sliding unit has a convex surface in the shape of a cylinder section and the joint socket has a concave surface in the shape of a hollow cylinder section. The second possible embodiment of a sliding bearing device is depicted in FIGS. 7a and 7b. In this case, the sliding part or the sliding unit has a convex surface in the shape of a cylinder section. The joint socket, on the other hand, does not have a concave surface in the shape of a hollow cylinder section, but contact areas that slide in the case of a movement along the convex surface. The third possible embodiment of the sliding bearing device is depicted in FIGS. 8a and 8b. In this case, the joint socket has a concave surface in the shape of a hollow cylinder section. The sliding unit, on the other hand, does not have a convex surface (like the embodiment in accordance with FIGS. 1-6), but contact areas that slide with a movement of the joint along the concave surface of the joint socket.

Any combinations of the three described embodiments of the sliding bearing devices are now possible in order to realize two or more swivel planes of the laser unit.

For example, the tilting of the laser unit in a first swivel plane may be accomplished by means of a sliding bearing device in accordance with the first embodiment (FIGS. 1-6) and the tilting in a second swivel plane that varies from the first swivel plane may be accomplished with a sliding bearing device in accordance with the third embodiment (FIGS. 8a, 8b).

Any number of permutations are conceivable.

In addition, all preferred embodiments previously described in connection with FIGS. 1 through 6 are also correspondingly applicable in the case of the sliding bearing devices 40, 50, 56 and 66 in FIGS. 7 and 8.

For example, in the case of the sliding bearing devices according to FIGS. 7 and 8, tension springs may be provided as before, by means of which the respective sliding part is pressed into the joint socket. Likewise, safety devices that are firmly connected to the joint socket may be provided, by means of which the sliding unit can be prevented from falling out of the joint socket.

In addition, materials as described above may be selected. For example, an appropriate selection of the materials in FIGS. 7 and 8 can assure that that in each case material whose sliding property has been modified, for example plastic, slides on material whose sliding property has not been modified.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A laser instrument, comprising:
    a laser unit; and
    a sliding bearing device, wherein the laser unit is disposed within the sliding bearing device, and wherein the sliding bearing device comprises a joint socket and a sliding unit, wherein the sliding unit has a convex surface in a shape of a cylinder section and the joint socket has a concave surface in a shape of a hollow cylinder section such that the convex surface is engageable in the concave surface and the laser unit is tiltable in a swivel plane during a relative movement between the convex surface and the concave surface.

2. The laser instrument according to claim 1, wherein the sliding bearing device further comprises:
    a second joint socket embodied in the sliding unit; and
    a second sliding unit, wherein the second sliding unit has a second convex surface in a shape of a second cylinder section and the second joint socket has a second concave surface in a shape of a second hollow cylinder section such that the second convex surface is engageable in the second concave surface and the laser unit tilts in a second swivel plane during a relative movement between the second convex surface and the second concave surface.

3. The laser instrument according to claim 2, wherein the swivel plane and the second swivel plane are at a predetermined angle from one another.

4. The laser instrument according to claim 2, wherein the swivel plane and the second swivel plane are at right angles to one another.

5. The laser instrument according to claim 2, wherein a radii of the second cylinder section and of the second hollow cylinder section are essentially equal.

6. The laser instrument according to claim 2, wherein a radii of the cylinder section, of the second cylinder section, of the hollow cylinder section and of the second hollow cylinder section are essentially equal.

7. The laser instrument according to claim 2:
    wherein the laser unit includes a laser for generating a laser beam and a deflection device for deflecting the laser beam at a deflection point;
    and wherein a center point of a cylinder forming the cylinder section, a center point of a cylinder forming the second cylinder section, a center point of a hollow cylinder forming the hollow cylinder section, and/or a center point of a hollow cylinder forming the second hollow cylinder section coincide with the deflection point.

8. A laser instrument according to claim 2, further comprising a tension spring, wherein the tension spring presses the concave surface and the convex surface together and further comprising a second tension spring, wherein the second tension spring presses the second concave surface and the second convex surface together.

9. A laser instrument according to claim 2, further comprising a safety device connecting the joint socket to the sliding unit and further comprising a second safety device connecting the second sliding unit to the second joint socket.

10. The laser instrument according to claim 2, wherein the second concave surface is produced from a material whose sliding property has been modified.

11. The laser instrument according to claim 2, wherein the concave surface and the second convex surface are produced from a material whose sliding property has not been modified.

12. The laser instrument according to claim 1, wherein a radii of the cylinder section and of the hollow cylinder section are essentially equal.

13. A laser instrument according to claim 1, further comprising a tension spring, wherein the tension spring presses the concave surface and the convex surface together.

14. A laser instrument according to claim 1, further comprising a safety device connecting the joint socket to the sliding unit.

15. The laser instrument according to claim 1, wherein at least one of the convex surface and the concave surface is produced from a material whose sliding property has been modified.

16. A laser instrument, comprising:

a laser unit; and a sliding bearing device, wherein the laser unit is disposed within the sliding bearing device, and wherein the sliding bearing device comprises a joint socket and a sliding unit, wherein the sliding unit has a convex surface in a shape of a cylinder section and the joint socket has at least two contact areas such that the convex surface is engageable with the at least two contact areas and the laser unit is tiltable in a swivel plane during a relative movement between the convex surface and the at least two contact areas.

17. The laser instrument according to claim 16, wherein the at least two contact areas have a shape of a hollow cylinder section.

18. The laser instrument according to claim 16:

wherein the laser unit includes a laser for generating a laser beam and a deflection device for deflecting the laser beam at a deflection point;

and wherein a center point of a cylinder forming the cylinder section coincides with the deflection point.

19. The laser instrument according to claim 16, further comprising a tension spring wherein the tension spring presses the at least two contact areas and the convex surface together.

20. The laser instrument according to claim 16, further comprising a safety device connecting the joint socket to the sliding unit.

21. A laser instrument, comprising:

a laser unit; and a sliding bearing device, wherein the laser unit is disposed within the sliding bearing device, and wherein the sliding bearing device comprises a joint socket and a sliding unit, wherein the sliding unit has at least two contact areas and the joint socket has a concave surface in a shape of a hollow cylinder section such that the at least two contact areas are engageable with the concave surface and the laser unit is tiltable in a swivel plane during a relative movement between the at least two contact areas and the concave surface.

22. The laser instrument according to claim 21, wherein the at least two contact areas have a shape of a cylinder section.

23. The laser instrument according to claim 21:

wherein the laser unit includes a laser for generating a laser beam and a deflection device for deflecting the laser beam at a deflection point;

and wherein a center point of a hollow cylinder forming the hollow cylinder section coincides with the deflection point.

24. The laser instrument according to claim 21, further comprising a tension spring wherein the tension spring presses the concave surface and the at least two contact areas together.

25. The laser instrument according to claim 21, further comprising a safety device connecting the joint socket to the sliding unit.

* * * * *